June 12, 1934.  P. R. OWENS  1,962,999
HEATING SYSTEM
Filed Jan. 7, 1928  2 Sheets-Sheet 1

INVENTOR.
Percy R. Owens
BY
Ward, Crosby + Smith
ATTORNEYS.

June 12, 1934.  P. R. OWENS  1,962,999
HEATING SYSTEM
Filed Jan. 7, 1928  2 Sheets-Sheet 2

INVENTOR.
Percy R. Owens
BY
Ward, Crosby & Smith
ATTORNEYS.

Patented June 12, 1934

1,962,999

UNITED STATES PATENT OFFICE 1,962,999

HEATING SYSTEM    REISSUED

Percy R. Owens, Mount Kisco, N. Y., assignor of twenty-five per cent to Page S. Haselton, Bayside, Long Island, N. Y.

Application January 7, 1928, Serial No. 245,104

7 Claims. (Cl. 237—9)

This invention relates to heating systems and more particularly to certain controlling and regulating features therefor.

In my copending applications Ser. No. 73,371, filed December 5, 1925, and Ser. No. 81,465, filed January 15, 1926, I have disclosed heat controlling apparatus for intermittently checking the supply of fluid heating medium to heating systems, the checking of the supply preferably occurring during periods of regulated length automatically or adjustably determined by outdoor temperature changes. This invention according to certain of its phases is adaptable as an improvement to the apparatus of said copending applications, although the use of this invention is not restricted to such apparatus.

The objects of this invention include the provision of a novel heat regulating method, and apparatus and equipment of the above indicated class which will be adaptable to a wide variety of operating conditions and which will be dependable, relatively simple and efficient in operation.

Various further and more specific objects, features and advantages will clearly appear from the detailed description given below, taken in connection with the accompanying drawings which form a part of this specification and illustrate merely by way of example certain embodiments of the invention.

The invention consists in the novel method and the novel features, arrangements and combinations of parts embodied by way of example only in the apparatus hereinafter described.

In the drawings, Fig. 1 shows a conduit system for a heating plant embodying the invention hereof and also, by way of example only, the manner in which the apparatus of my copending application 73,371 above mentioned may be utilized in connection with this invention;

Figure 1:
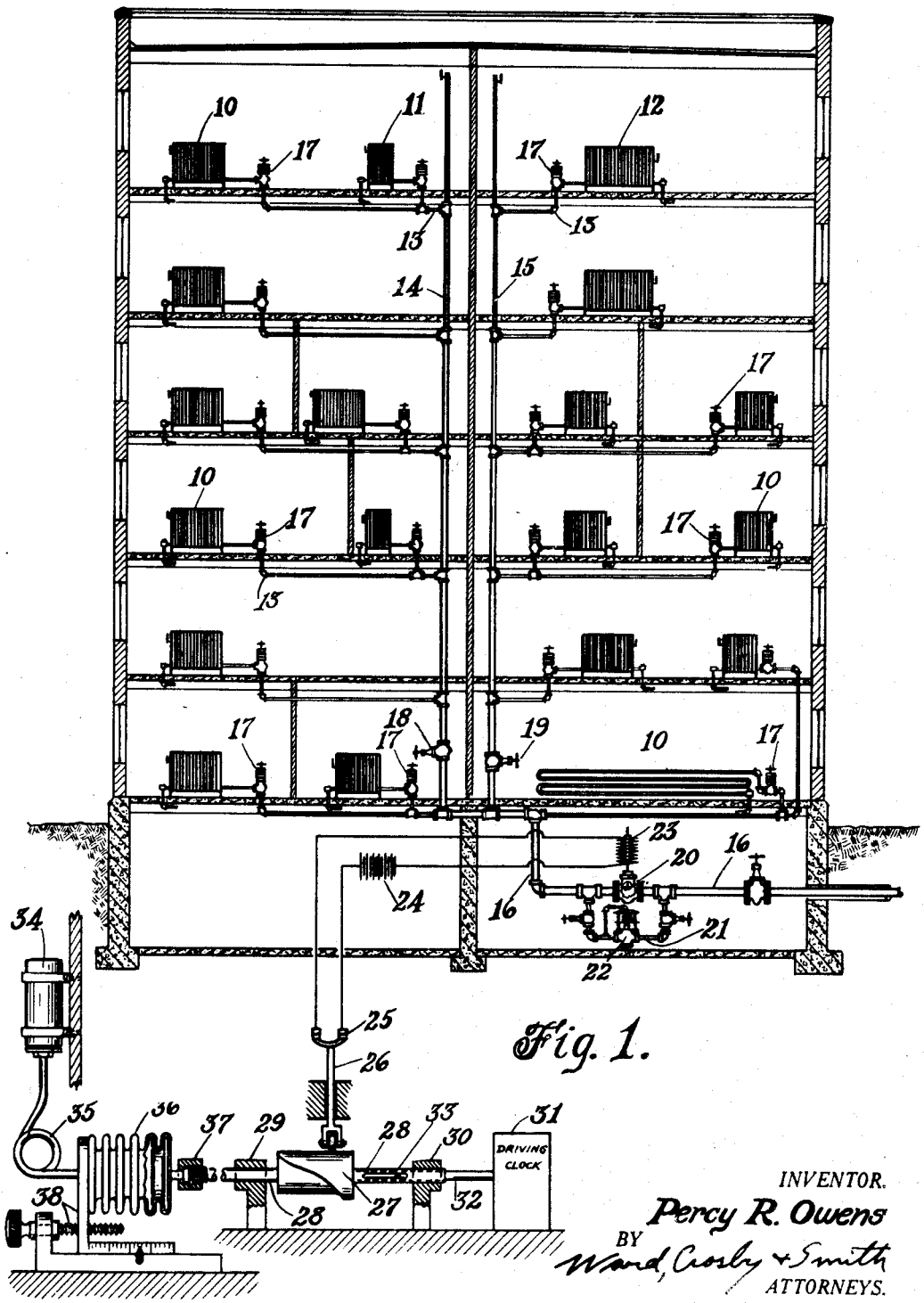

Referring to the drawings in further detail, a structure such as an office building which is to be heated, is indicated in Fig. 1 and each room or compartment of the structure is provided with a conventional form of heat radiating unit such as the radiators 10, 11 and 12. For each of these radiating units or for each group of such units, a supply conduit is provided as at 13 and such conduits may be connected in the conventional manner to "risers" as at 14 and 15, which in turn, may be connected in the basement of the building to a main supply conduit as at 16.

A special form of pressure actuated valve 17 as hereinafter described in further detail, may be interposed in the conduits preferably at each of the radiating units or at each group of units. Suitable valves as at 18 and 19 may be installed in the "risers" 14 and 15 respectively.

The main supply conduit 16, according to one phase of the invention, may be provided with an intermittently actuated and thermostatically controlled valve as at 20. As is fully set forth in said copending applications, such an intermittently operated valve may be so controlled as to check the flow of the heating medium during periods of thermostatically regulated length. I have found, however, that it is highly desirable in many instances to provide means for furnishing sufficient fluid heating medium during the periods of checking to maintain the conduit system in substantially heated condition and according to one phase of this invention, such means is provided, as shown, in the form of a by-pass conduit 21 in which a reducing valve 22 is interposed. With this arrangement, the pressure operated valves as at 17 may be set to normally remain closed until such time as the pressure in the conduit system is raised to a predetermined critical value. That is, for example, fluid heating medium may be admitted to the conduit system through the by-pass 21 and reducing valve 22 in sufficient quantities to establish and maintain a pressure below a predetermined critical pressure of say, one pound, and sufficient to keep the conduit system in substantially heated condition during periods when the intermittently operated valve 20 is nearly or completely closed. Accordingly, during intervals when the valve 20 is closed, the radiating units as at 10 and 12 will not be supplied with the heating medium, yet the conduits will be supplied with heating medium at a relatively low pressure and the conduit system is thus kept warm. Upon opening of the valve 20, the heating medium at higher pressure is promptly carried to even the more remote radiating units in the system without the necessity of first raising the temperature of the conduits over any wide range. At the same time, the conduits when thus kept warm or heated, are not subject to intermittent contraction and expansion periodically with the operation of the valve 20 and accordingly leakage at the joints of the piping, etc., is substantially minimized.

The intermittently operated valve 20 in the particular arrangement shown in my copending application 73,371 and as indicated in Fig. 1, is electromagnetically operated by a solenoid 23 having an electrical circuit including a source of current 24 and a circuit breaker 25 of any suitable known type. The circuit breaker 25 is designed to be operated by a plunger member 26 which in turn may be intermittently actuated by a constantly rotated clock driven cam member or the like, as indicated at 27. As shown, the cam member may be fixed upon a drive shaft 28, which is rotatably and slidably mounted within the bearing members 29 and 30. A driving clock is indicated at 31 and is provided with a shaft 32 which may be continuously driven at a constant rate by the clock and which in turn serves to constantly drive the shaft 28 with its cam 27, the clock shaft being associated with the shaft 28 through any suitable form of slidable coupling as indicated at 33.

A bulb member 34 located, for example, out-of-doors where it is subjected to the prevailing outside temperatures, is communicative by conduit 35 with an expansible chamber 36 containing a temperature sensitive fluid. The expansible chamber in turn may be secured by a swivel joint 37 to the cam shaft 28. The position of the expansible chamber 36 may be adjusted in respect to the cam shaft as by an adjustable mounting as indicated at 38.

As shown, the cam member 27 may be provided with raised portions of gradually tapered width for engagement with the switch operating plunger 26, whereby the plunger is given an intermittent up and down motion. The duration of the periods during which the plunger is in its upper position are determined by the extent of the raised portions on the cam member 27 at the circumferential line of engagement of the cam and plunger members. The longitudinal position of the cam is thermostatically regulated by the temperature sensitive bulb 34 acting in co-operation with the expansible member 36 in a manner obvious from the drawings. Such regulation determines which portions of the gradually tapered raised areas on the cam 27 are to engage the plunger 26 and thus the expansion or contraction of member 36 changes the duration of the periods during which the plunger 26 is in raised position. Whenever the plunger member 26 is raised, the circuit to the solenoid 23 is closed as shown, which results in the opening of the valve 20, the valve remaining open until the electrical circuit is opened upon lowering of the plunger member 26. The operation and advantages of this intermittently actuated valve operating means and various modifications thereof are fully set forth and claimed in my copending applications above mentioned and therefore need not be here described in further detail.

Figure 2:
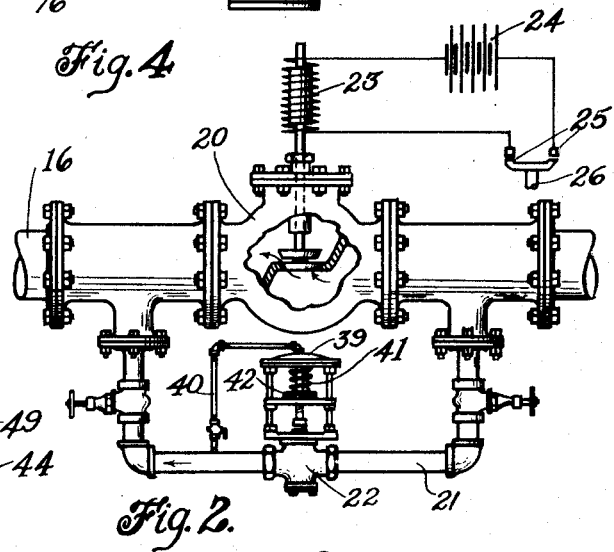
Fig. 2 is an enlarged detailed view of a portion of the apparatus of Fig. 1.

Referring to Fig. 2, the by-pass conduit and the pressure reducing valve therein are there shown in further detail. The reducing valve may be of any suitable conventional type having a diaphragm chamber as at 39 having a connection as at 40 with the low pressure side of the by-pass, and a control spring 41. The reducing valve may be made adjustable in any suitable manner as by a hand wheel 42 for adjusting the tension of the spring 41. The valve may thus be so adjusted as to permit a sufficient pressure in the conduits of the heating system to fulfill the desired objects of the by-pass, but insufficient to cause the pressure operated valves of certain or all of the radiator units to open until such time as the intermittently operated valve 20 is caused to open.

Figure 3:
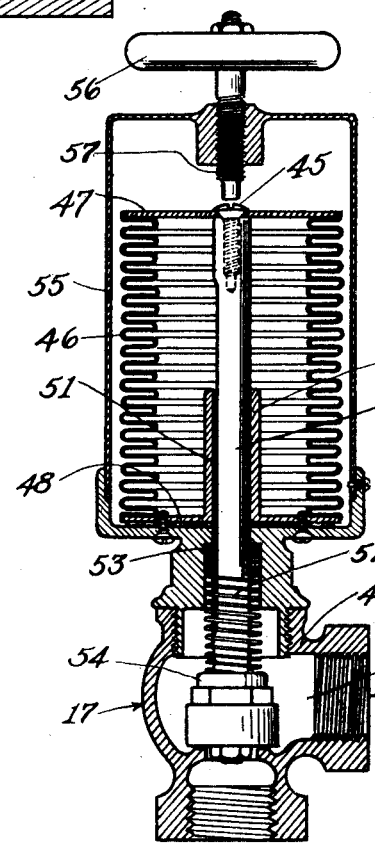
Fig. 3 is a vertical sectional view through a typical pressure operated valve, such as may be used in the conduit system of Fig. 1.

One form of pressure operated valve as indicated at 17 in Fig. 1 is shown in further detail in Fig. 3. A valve chamber as at 43 of substantially conventional form may be provided. However, in lieu of the conventional threaded valve stem, a slidable plunger stem may be provided as at 44 secured at its upper end as at 45 to the upper end wall of an expansible pressure sensitive chamber member 46. The member 46 may take the form of flexible corrugated thin walled tubing of a well known type having its ends sealed respectively as by plates 47 and 48. The plate 48 may be provided with a central cylindrical portion 49 forming a bearing member embracing the stem 44, the stem being slidably received therein. The interior of the chamber member 46 is preferably made communicative with the inlet 50 of the valve through a relatively small passage as at 51 provided by forming a flattened area along the stem member 44, the stem member 44 otherwise engaging the cylindrical portion 49 in relatively close fitting relationship. A coiled spring 52 is provided to encircle the lower part of the valve stem 44, such spring being so tensioned as to normally hold the valve in closed position. Such tensioning of the spring may be made adjustable in any suitable manner as by providing a larger or smaller number of washer members as at 53 at one end of the spring, the spring being seated at its upper end against such washers which in turn are pressed into engagement with the upper end wall of a spring cavity as shown. The lower end of the spring may rest in engagement with a valve member 54, which may be of a suitable well known construction. The chamber member 46 may be enclosed within a suitable protective housing as at 55. If desired, a hand wheel 56 may be provided at the top of the housing 55 and having a threaded stem 57 for engagement with the upper end wall of the chamber member 46. By manipulating the hand wheel 56, the chamber member 46 may be held in compressed condition such that increased pressures therein will be ineffective to open the valve, or when one desires to have the valve made sensitive to pressure changes, the hand wheel 56 may be turned so as to raise the screw member 57 sufficiently to permit expansion of the member 46 and automatic operation of the valve.

As to constructional features of the valve which are not herein substantially shown and described in detail, the usual practice followed in the construction of the conventional types of valves may be followed in general.

The operation of the valve shown in Fig. 3 in connection with the arrangement shown in Fig. 1 may be as follows:

Whenever the intermittently operative valve 20 is closed, fluid medium may be supplied through the by-pass 21 to the conduit system, but such by-pass supply will ordinarily be of a pressure, say of one pound or less, and insufficient to build up a pressure within the expansible valve members 46 sufficient to cause the valves to be opened. Accordingly the heating medium will be shut off from the radiating units during such periods. However, upon the opening of the valve 20, a sufficient pressure may if desired be at once carried to even the more remote portions of the conduit system, causing the expansible valve members 46 to be expanded, thus compressing the springs 52 and causing the valve stems 44 to be raised to open the valves. However, since the chambers 46 are communicative with the valve inlets 50 preferably through only the small openings 51, a very short time interval will be required on each occasion for sufficient pressure to be built up in the expansible members to cause actual operation of the valves, but upon reduction of the pressure, a dash-pot action is secured. Thereby the possibility of too rapid movement of the valve stems is substantially eliminated, thus preventing any tendencies for the valves to "chatter". Wherever one does not desire to have heat admitted to the radiating unit of his room or office, the hand wheels 56 of the valves in his office may be turned down sufficiently to preclude opening of the valve regardless of the pressure conditions within the the conduit system. In some instances, as hereinafter further described, it may be desirable to provide a plurality of pressure gradations in the heating system, each of the valves as of Fig. 3 being then made adjustable to be responsive to one of such pressures as desired, such adjustment being accomplished either by adjustment of the springs 52 as above explained, or otherwise.

The available supply of the heating medium will of course be determined by the relative lengths of the periods during which the valve 20 is intermittently opened and closed and such periods may be determined and adjusted thermostatically by electrical, mechanical or fluid operated devices as explained in my above mentioned copending applications.

Figure 4:
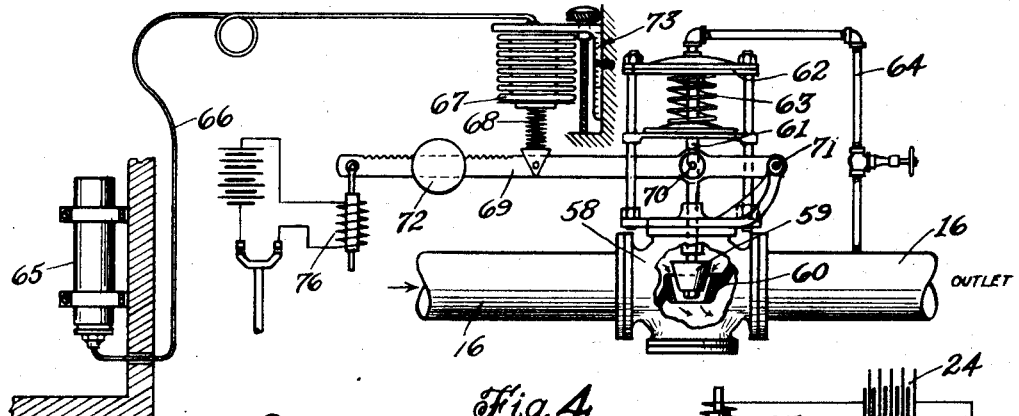
Fig. 4 is a view corresponding to that of Fig. 2 but showing another embodiment of the invention.

Very accurately regulated heating may be accomplished by providing instead of the particular intermittently controlled valve 20, a valve in the main supply line regulated to maintain pressure to the conduit system proportional or approximately proportional to the changes in the prevailing temperature. Such a valve, provided with automatic thermostatic regulating means is indicated in Fig. 4 and may be interposed in the main supply conduit 16. The valve 58 as here shown may be constructed in general according to a conventional form of adjustable pressure reducing valve. A conical slidable valve member 59 is shown and cooperates with a corresponding conically shaped valve seat 60. The member 59 is carried upon a vertically movable valve stem 61 cooperating at its upper end with a flexible diaphragm chamber of a well known form indicated at 62. The position of the diaphragm, and accordingly the position of the valve stem and valve, is controlled conjointly by a compression spring 63 and fluid pressure from the low pressure side of the conduit 16 as supplied through a connection 64. In order to adjust such as valve according to out-door or other temperature changes, a temperature sensitive bulb may be provided as at 65 communicative through a conduit 66 with a flexible expansible chamber member 67 having a yielding or spring connection 68 with a lever 69. The lever 69 may be pivotally secured as at 70 to the valve stem 61, the lever being fulcrumed as at 71. The lever 69 is preferably provided with a weight as at 72 which is adjustable in its position along the lever.

Whenever the temperature affecting the bulb 65 rises, a suitable temperature sensitive fluid therein may be expanded with a consequent expansion of the flexible container 67. This causes the container 67 to be extended downwardly, resulting in the compression of the spring 68 against the lever 69. The pressure of the spring 68 against the lever accompanied by the force of gravity on the weight member 72 tends to counteract the effect of the spring 63 to a greater or lesser extent, depending upon the temperature variations at the bulb 65 and also upon the position of the weight 72, and further upon the position of the flexible container 67, which is made vertically adjustable in any desired manner, such as indicated at 73. With the adjustments thus available, the reducing valve 58 may be arranged to be normally slightly open whenever the out-door temperature is comparatively high. This will permit sufficient heating medium to be admitted to the conduits to keep such conduits in heated condition, but insufficient to cause the pressure operated valves at the radiating units to be opened, or at least to any considerable extent. As the prevailing temperature decreases, however, the pressure within the flexible member 67 will decrease, causing such member to contract and to diminish the pressure of the spring 68 upon the lever 69. Thereupon the spring 63 will cause the reducing valve 58 to be opened further, the extent of the movement of the valve bearing a desired predetermined relationship to the reduction in the prevailing temperature such that proper heating is provided.

Figure 5:
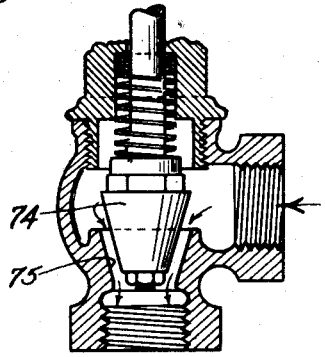
Fig. 5 is a sectional view of a valve member corresponding to that of Fig. 3, but showing an alternative form of valve particularly adaptable for use in conection with the modification of the invention indicated in Fig. 4.

With the reducing valve arrangement as shown in Fig. 4, it is desirable to provide a special form of pressure sensitive valve at the radiating units, for example, such as of Fig. 5. This valve may be constructed in the same manner as that of Fig. 3, with the exception that the valve member at 74 may be conical in shape to cooperate with a valve seat 75 of a corresponding conical shape. Such a valve when its expansible member 46 is acted upon by a certain pressure, will be opened to an extent depending upon such pressure. The valve may be either so designed as to be normally closed until a certain predetermined minimum pressure is applied, or if desired, the valve spring or other parts may be made adjustable to accomplish the same purpose as described in connection with the valve of Fig. 3.

By the use of the variable pressure reducing valve of Fig. 4 cooperating with variable pressure sensitive valves at the radiating units of the form shown in Fig. 5, such valves may be so adjusted that the conduits will be normally heated and kept filled with heating medium of a desired low pressure for such purpose without actual opening of the valves of the radiating units. Then whenever there is a decrease in temperature, sufficient to warrant heating of certain offices or compartments, the valve 58 will open further to the extent necessary to provide greater pressures in the system. Certain of the offices or compartments may not at first require such heating and the valves at the radiating units in such offices may accordingly be so adjusted as to not open until the valve 58 opens further. Others of the valves may be so adjusted as to open more quickly upon raising the pressure, to meet the conditions, and the extent to which each of the radiating unit valves is opened will bear a predetermined relationship to the pressure in the conduits and accordingly also to the opening of the valve 58. A heating system is thus provided which is quickly responsive and readily adjustable to a wide variety of temperature conditions as may affect various parts of the building suddenly or gradually, whether such changes are uniform or unequal at various parts of the building. With this embodiment of the invention it will be understood that the various valves 17 may be adjusted to open at various different critical pressure valves such as may be desirable to meet the various conditions. The riser valves as at 18 and 19 may also if desired be of the same general type as of Fig. 5 in order that heat may be excluded entirely from certain sections of the building. At the same time, assurance is given with the valves of Figs. 3 and 5, both automatically and by manually operable means, against excessive heating of any particular part of the building, but without necessitating complete shutting-off of the heat to such part, merely because the available supply may be excessive.

If desired, the valve 58 of Fig. 4 may also be actuated intermittently in substantially the same manner as valve 20 to provide a thoroughly flexible regulating means. For this purpose a solenoid 76 may be applied to the lever 69 as shown. This solenoid may be energized, for example, in the same manner as solenoid 23, and with sufficient force to either completely close or nearly close the valve 58 at short intervals, either of uniform length or of thermostatically regulated length. Thus the intervals of heating may be adjustably varied in length independently of the pressure control or simultaneously with changes in the pressure control.

The improvements embodying this invention are, it will be observed, adaptable to heating plants of both new constructions and old, inasmuch as for old installations it is merely necessary to replace the valve members or parts thereof with pressure actuated valves at each radiating unit and to install the control valve or valves as above described in the basement.

While the invention has been described in detail with respect to particular preferred examples which give satisfactory results, it will be understood by those skilled in the art, after understanding the invention, that various changes and modifications may be made without departing from the spirit and scope of the invention, and it is intended therefore in the appended claims to cover all such changes and modifications.

What is claimed as new and desired to be secured by Letters Patent of the United States is:

1. A heating system comprising a source of supply of a fluid heating medium, conduit means, radiating means connected to said source by said conduit means, thermostatically operated valve means in said conduit periodically checking the flow and reducing the pressure to the radiating means, the duration of such periods varying inversely with heat demand, and a by-pass around said valve means for maintaining only a predetermined minimum pressure supply in said conduit means, and insufficient to cause heating of all the radiating means.

2. A heating system comprising a source of supply of a fluid heating medium, conduit means, radiating means connected to said source by said conduit means, thermostatically operated valve means in said conduit periodically checking the flow and reducing the pressure to the radiating means, the duration of such periods varying inversely with heat demand, a by-pass around said valve means and having a reducing valve therein for maintaining at least a predetermined pressure supply in said conduit means, insufficient to cause heating of all the radiating means.

3. A heating system comprising a plurality of radiating units, a conduit system therefor, a normally closed pressure operated valve for each of said units and through which a fluid heating medium may be admitted to said units, said valves being each set to open at predetermined minimum pressures, means for constantly maintaining in the conduit system sufficient fluid heating medium to maintain the conduit system in heated condition, and means for intermittently supplying fluid heating medium at pressures sufficient to open one or more of said valves.

4. A heating system comprising a plurality of radiating units, a conduit system therefor, a normally closed pressure operated valve for each of said units and through which a fluid heating medium may be admitted to said units, said valves being each set to open at predetermined minimum pressures, means for constantly maintaining in the conduit system sufficient fluid heating medium to maintain the conduit system in heated condition, and means for intermittently supplying during periods of thermostatically regulated length, fluid heating medium pressures sufficient to open one or more of said valves, the duration of said periods increasing with increase of heat demand.

5. In a heating system a supply pipe, a normally closed valve member, a heating device connected to said supply pipe through said valve member, said valve member being designed to open upon an increase in pressure in the supply pipe above a predetermined critical value whereby the valve permits heating fluid to flow into the heating device whenever pressure in the supply pipe exceeds such critical value, but whenever such pressure is reduced below said critical value, the heating device is automatically cut off from communication with the supply pipe, and means for automatically and intermittently raising and reducing alternately the pressure in the supply pipe.

6. In a heating system a supply pipe, a normally closed valve member, a heating device connected to said supply pipe through said valve member, said valve member being designed to open upon an increase in pressure in the supply pipe above a predetermined critical value whereby the valve permits heating fluid to flow into the heating device whenever pressure in the supply pipe exceeds such critical value, but whenever such pressure is reduced below said critical value, the heating device is automatically cut off from communication with the supply pipe, and thermostatically regulated means for alternately raising and reducing the pressure in the supply pipe at intervals of time, the length of the raised pressure periods increasing with increases of heat demand.

7. In a heating system a supply pipe, a normally closed valve member, a heating device connected to said supply pipe through said valve member, said valve member being designed to open upon an increase in pressure in the supply pipe above a predetermined critical value whereby the valve permits heating fluid to flow into the heating device whenever pressure in the supply pipe exceeds such critical value, but whenever such pressure is reduced below said critical value, the heating device is automatically cut off from communication with the supply pipe, and remotely controlled thermostatic means for automatically raising and reducing the pressure in the supply pipe, the raised pressure periods increasing with increases of heat demand.

PERCY R. OWENS.